US006458033B1

(12) United States Patent
Shoji

(10) Patent No.: US 6,458,033 B1
(45) Date of Patent: Oct. 1, 2002

(54) PROGRAM FOR PROCESSING A LIVE COMMENTARY, COMPUTER-READABLE RECORDING MEDIUM ON WHICH SUCH A PROGRAM IS RECORDED, AND LIVE COMMENTARY PROCESSING APPARATUS AND METHOD

(75) Inventor: Tatsuya Shoji, Kanagawa (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/628,285

(22) Filed: Jul. 28, 2000

(30) Foreign Application Priority Data

May 19, 2000 (JP) ........................................ 2000-188469
Jun. 9, 2000 (JP) ........................................ 2000-174556

(51) Int. Cl.⁷ ............................ A63F 13/00; G06F 14/00
(52) U.S. Cl. ............................................. 463/35; 463/1
(58) Field of Search .................................. 463/1–4, 7–8, 463/30–31, 43–45, 34–36; 434/247–252, 257, 307 R, 365, 392; 369/124.07, 124.08, 124, 54, 57, 58, 60, 61, 62, 63, 69, 70

(56) References Cited

U.S. PATENT DOCUMENTS

| | | | | |
|---|---|---|---|---|
| 5,026,051 A | * | 6/1991 | Lowe et al. | 273/435 |
| 5,462,275 A | * | 10/1995 | Lowe et al. | 273/94 |
| 5,553,048 A | * | 9/1996 | Maeda | 396/60 |
| 5,599,231 A | * | 2/1997 | Hibino et al. | 463/29 |
| 5,687,161 A | * | 11/1997 | Owaki | 396/275.3 |
| 5,735,743 A | | 4/1998 | Murata et al. | |
| 6,141,730 A | * | 10/2000 | Nishiumi et al. | 711/115 |

FOREIGN PATENT DOCUMENTS

JP 7163754 6/1995

* cited by examiner

*Primary Examiner*—Jessica Harrison
*Assistant Examiner*—Alex F. R. P. Rada, II
(74) *Attorney, Agent, or Firm*—Greenblum & Bernstein, P.L.C.

(57) ABSTRACT

Upon issuance of a sound reproduction request, storage locations of sound data constituting a sentence are determined. A live commentary sound is output based on the sound data that are stored in a distributed manner. At this time, the sound data in a CD-ROM are transferred to a RAM in a divisional manner. The sound data that have been transferred to the RAM are then transferred to a sound memory in a divisional manner. In this manner, even sound data of a long sentence can be read from the CD-ROM with a small number of times of access.

16 Claims, 13 Drawing Sheets

PROGRAM FOR PROCESSING A LIVE COMMENTARY, COMPUTER-READABLE RECORDING MEDIUM ON WHICH SUCH A PROGRAM IS RECORDED, AND LIVE COMMENTARY PROCESSING APPARATUS AND METHOD

The present disclosure relates to subject matter contained in Japanese Patent Application No. 2000-174556, filed on Jun. 9, 2000, the disclosure of which is expressly incorporated herein by reference its entirety.

BACKGROUND OF THE INVENTION

1. Field of the Invention

The present invention relates to a program for processing a live commentary in a sport game, such as, for example, a computer-readable recording medium on which such a program is recorded, and a live commentary processing apparatus and method.

2. Description of the Related Art

At present, games of various sports such as tennis, soccer, basketball, American football, and baseball are available.

Among sport games are ones in which a live commentary is reproduced in accordance with actions of players in the game. By reproducing a live commentary, it is possible to give a user the feeling of being at the site that is of the same kind as would be given by actual on-the-spot TV broadcast. In general, sound data of a live commentary is data obtained by converting an analog waveform into a digital one. Such live commentary sound data has a longer data length than data indicating musical scales etc. such as MIDI (Music Instrument Digital Interface) data. Therefore, in the case of live commentary sound data, all data cannot be stored in a sound processing section which performs sound output. In reproducing a sound, it is necessary to transfer data from a main memory or the like to the sound processing section each time.

As an example technique for transferring live commentary sound data, a game machine having a live commentary function is known that is disclosed in Japanese Unexamined Patent Publication No. Hei. 7-163754. This publication discloses a technique in which commentary terms are specified and transferred from a commentary term storing section to a buffer and then the data stored in the buffer is divided and divisional data are sequentially transferred to a sound CPU.

In recent sport games, the reality of a live commentary sound has been investigated. In particular, in baseball games, reproduction of a realistic live commentary sound as in TV broadcast is required because most of users are accustomed to viewing baseball TV broadcast.

To realize a realistic live commentary in a video game, it is necessary to reproduce not only simple words such as "batted" and "caught" but also sentences including a subject and a predicate. For example, a live commentary can be made closer to a counterpart in actual broadcast by reproducing a sound "the pitcher went into his motion to throw the first pitch" when a defense-side user has input a manipulation for throwing the ball.

Further, to output a live commentary sound in the form of a sentence, a great many kinds of sound data for various game situations are necessary. Therefore, it is necessary to reproduce a commentary sound by reading sound data each time from a large-capacity recording medium such as a CD-ROM.

However, where sound data is transferred from such a recording medium as a CD-ROM to the sound processing section after being divided into data having a data length that is suitable for the storage capacity of a buffer in the sound processing section, access to the recording medium occurs at a high frequency. In the case of access to a large-capacity recording medium such as a CD-ROM, certain time is needed to find target data. In the case of a CD-ROM, for example, a head seek time etc. are needed.

In general, while live commentary sound data is read from such a recording medium as a CD-ROM, other data necessary for advancing the game cannot be read from the same recording medium. In the above circumstances, a technique capable of reducing the number of times of access to such a recording medium as a CD-ROM for readout of sound data is now demanded.

SUMMARY OF THE INVENTION

An object of the present invention is to provide a program for processing a live commentary in a sport game, a computer-readable recording medium on which such a program is recorded, a live commentary processing apparatus and method which can reproduce a sound by reading, efficiently with a smaller number of times of access, sound data from a recording medium on which a large amount of sound data is stored.

To attain the above object, a first aspect of the invention provides a computer-readable recording medium on which a program for processing a live commentary in a video game is recorded, the program causing a computer to execute the steps of judging states of a situation in a video game; determining a combination and order of one or more sound data that are necessary to commentate in accordance with the judged states from among sound data that are stored in a distributed manner as units of live commentary statements; recognizing storage locations of the one or more sound data based on information that is stored in advance to be used for recognizing storage locations of the respective sound data; and commentating by reading the one or more sound data from the recognized storage locations in the determined order.

A second aspect of the invention provides a computer-readable recording medium on which a program for processing a live commentary in a video game is recorded, the program causing a computer to execute the steps of judging states during processing of a video game; determining, in accordance with the judged states, code information from among pieces of code information that are provided in advance and each of which correlates each of situations that may occur in the game and a combination and order of one or more sound data; and commentating by reading one or more sound data indicated by the determined code information in order indicated by the determined code information.

A third aspect of the invention provides a program for processing a live commentary in a video game, the program causing a computer to execute the steps of judging states of a situation in a video game; determining a combination and order of one or more sound data that are necessary to commentate in accordance with the judged states from among sound data that are stored in a distributed manner as units of live commentary statements; recognizing storage locations of the one or more sound data based on information that is stored in advance to be used for recognizing storage locations of the respective sound data; and commentating by reading the one or more sound data from the recognized storage locations in the determined order.

A fourth aspect of the invention provides a program for processing a live commentary in a video game, the program causing a computer to execute the steps of judging states during processing of a video game; determining, in accordance with the judged states, code information from among pieces of code information that are provided in advance and each of which correlates each of situations that may occur in the game and a combination and order of one or more sound data; and commentating by reading one or more sound data indicated by the determined code information in order indicated by the determined code information.

A fifth aspect of the invention provides a live commentary processing apparatus comprising a recording medium on which a program for realizing live commentary processing in a video game is recorded; and a computer for reading at least part of the program from the recording medium and for executing it, the computer executing, by reading at least part of the program from the recording medium, the steps of judging states of a situation in a video game; determining a combination and order of one or more sound data that are necessary to commentate in accordance with the judged states from among sound data that are stored in a distributed manner as units of live commentary statements; recognizing storage locations of the one or more sound data based on information that is stored in advance to be used for recognizing storage locations of the respective sound data; and commentating by reading the one or more sound data from the recognized storage locations in the determined order.

A sixth aspect of the invention provides a live commentary processing apparatus comprising a recording medium on which a program for realizing sound output processing in a video game is recorded; and a computer for reading at least part of the program from the recording medium and for executing it, the computer executing, by reading at least part of the program from the recording medium, the steps of judging states during processing of a video game; determining, in accordance with the judged states, code information from among pieces of code information that are provided in advance and each of which correlates each of situations that may occur in the game and a combination and order of one or more sound data; and commentating by reading one or more sound data indicated by the determined code information in order indicated by the determined code information.

A seventh aspect of the invention provides a live commentary processing method for processing a live commentary in a video game, comprising the steps of judging states of a situation in a video game; determining a combination and order of one or more sound data that are necessary to commentate in accordance with the judged states from among sound data that are stored in a distributed manner as units of live commentary statements; recognizing storage locations of the one or more sound data based on information that is stored in advance to be used for recognizing storage locations of the respective sound data; and commentating by reading the one or more sound data from the recognized storage locations in the determined order.

An eighth aspect of the invention provides a live commentary processing method for processing a live commentary in a video game, comprising the steps of judging states during processing of a video game; determining, in accordance with the judged states, code information from among pieces of code information that are provided in advance and each of which correlates each of situations that may occur in the game and a combination and order of one or more sound data; and commentating by reading one or more sound data indicated by the determined code information in order indicated by the determined code information.

DETAILED DESCRIPTION OF THE PREFERRED EMBODIMENT

An embodiment of the present invention will be hereinafter described in detail with reference to the accompanying drawings. The following description will be directed to a baseball game as an example of sport games in which sound data of a live commentary or the like is reproduced.

Figure 1:
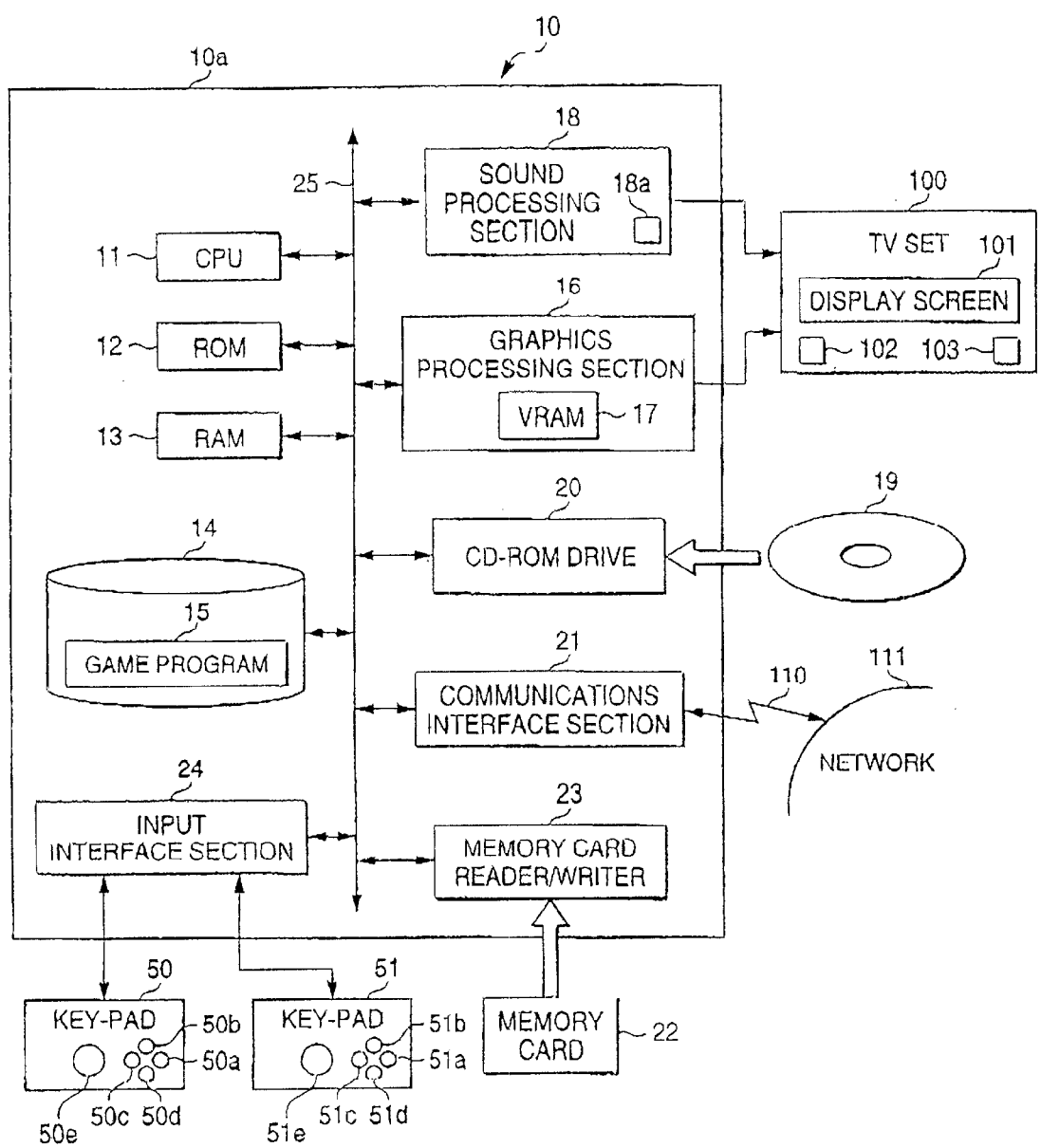
FIG. 1 is a block diagram showing an example configuration of a video game machine according to an embodiment of the present invention.

First, the configuration will be described with reference to FIG. 1. FIG. 1 shows an example configuration of a video game machine according to an embodiment of the invention. The video game machine 10 shown in FIG. 1 has a function of outputting a sound such as a live commentary sound according to the embodiment of the invention. The video game machine 10 executes a program that is recorded on a computer-readable recording medium according to the embodiment of the invention. The video game machine 10 executes a program according to the embodiment of the invention. The video game machine 10 is used in practice of a sound output method according to the embodiment of the invention.

For example, the video game machine 10 is provided with a game machine main body 10a for processing a video game according to a program, a key-pad 50 for manipulating a video game interactively, and a television set (hereinafter referred to as "TV set") 100 having a CRT monitor 101 or the like as a monitor having speakers 102 and 103. Also provided with a communication interface section 21, the video game machine 10 is connected to a network 111 via a communication line 110 and performs data communication with another network apparatus.

The key-pad 50 is provided with, for example, a button group such as buttons 50a–50d and a joystick 50e in such a manner that they can be manipulated by a user (operator). The key-pad 50 provides the game machine main body 10a with a command corresponding to a button manipulation or a joystick manipulation by the user. Another key-pad 51 is provided with, for example, a button group such as buttons 51a–51d and a joystick 51e (similar to key-pad 50) in such a manner that they can be manipulated by another user.

The buttons and the joystick have a function of inputting various manipulations of a baseball game (described later) such as a manipulation of throwing of the pitcher, a manipulation of a swing of the batter, a manipulation of base stealing by a runner, and a manipulation of catching/throwing by a fielder.

Based on a video signal and a sound signal that are output from the game machine main body 10a, the TV set 100 displays a picture on a display screen 101 and outputs sounds from left and right speakers 102 and 103 in accordance with a game situation.

The game machine main body 10a has an internal bus 25, to which a CPU 11, a ROM 12, a RAM 13, and a hard disk drive (hereinafter referred to as HDD) 14 are connected.

The CPU 11 controls the entire apparatus and performs game processing by storing part or all of a program in the RAM 13. A program, data to be read out when the game machine main body 10a is turned on, and other information are stored in the ROM 12 in advance.

A game program read from a CD-ROM 19 by a CD-ROM drive 20 and image data of a background, a game character, etc. that are necessary during execution of a program are stored in the RAM 13. Sound data that is read from the CD-ROM 19 is also stored in the RAM 13.

A game program and image data can be supplied from the HDD 14 as well as the CD-ROM 19. Where a game program and image data are supplied from the HDD 14, they may be stored in the recording media (hard disks) 15 in the HDD 14. A game program and image data may be stored in the hard disks 15 by advance installation or downloading from the network 111 via the communication line 110.

An input interface section 24, a sound processing section 18, and a graphic processing section 16 are connected to the internal bus 25. The key-pads 50 and 51 are connected to the internal bus 25 via the input interface section 24. The TV set 100 is connected to the internal bus 25 via the sound processing section 18 and the graphic processing section 16.

The graphic processing section 16 is provided with a VRAM 17 having a frame buffer. The graphic processing section 16 generates a video signal based on image data that is stored in the frame buffer according to commands that are supplied from the CPU 11 during execution of a program, and outputs the generated video signal to the TV set 100. As a result, a picture is displayed on the display screen 101 of the TV set 100 based on the image data stored in the frame buffer.

The sound processing section 18 generates a sound signal of a voice, BGM (background music), an effect sound, or the like according to commands that are supplied from the CPU 11, and outputs the generated sound signal to the TV set 100. The sound processing section 18 has a sound memory 18a inside. Sound data to be reproduced is stored in the sound memory 18a.

The CD-ROM drive 20 and a memory card reader/writer 23 are also connected to the internal bus 25. The CD-ROM drives 20 reads out a game program, image data, sound data, etc. that are stored in the CD-ROM 19 as a recording medium. The memory card reader/writer 23 writes and reads data to and from a memory card 22 under the control of the CPU 11. Examples of data to be written to the memory card 22 are data indicating an intermediate state of a game and data indicating an environmental setting of a game.

A baseball game is executed as its program according to the embodiment is executed by the video game machine having the above configuration. The program is read from the CD-ROM 19 and stored in the RAM 13. After execution of the baseball game program is started, various data are read from the CD-ROM 19 and stored in the memories of the video game machine 10. In this embodiment, sound data as units of a live commentary are stored in the CD-ROM 19 and the sound data memory 18a in a distributed manner.

Figure 2:
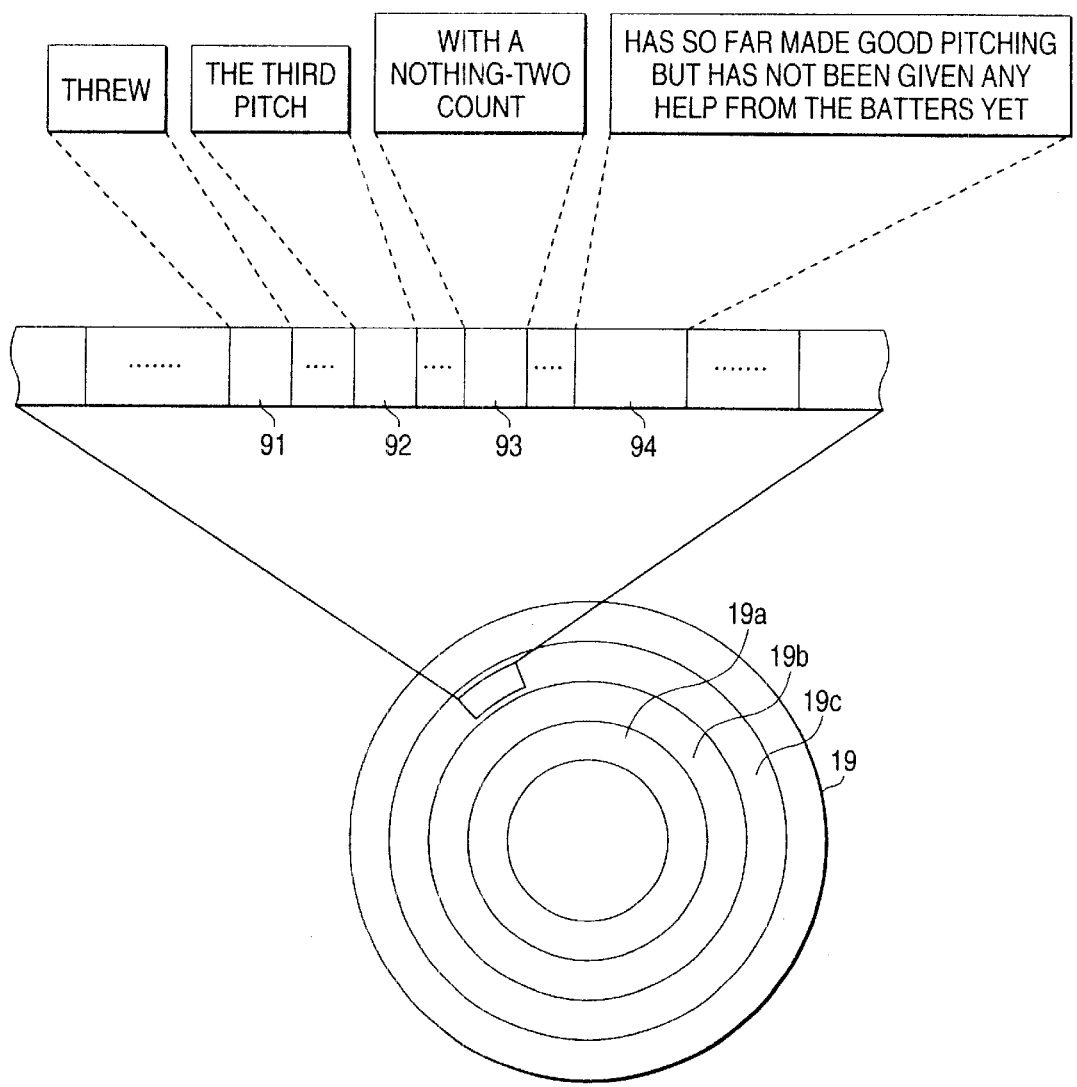
FIG. 2 schematically shows an example data structure of a CD-ROM.

First, the data structure of the CD-ROM 19 will be described. FIG. 2 schematically shows an example data structure of the CD-ROM 19. As shown in FIG. 2, a game program 19a of a baseball game according to the embodiment, a game data group 19b such as image data, a sound data group 19c for sound output, and other information are stored in the CD-ROM 19.

The sound data group 19c includes a plurality of sound data 91, 92, 93, 94, . . . Among the sound data 91, 92, 93, 94, . . . , the sound data 91 is commentary sound data of "threw," for example. The sound data 92 is commentary sound data of "the third pitch," for example. The sound data 93 is commentary sound data of "with a nothing-two count," for example. The sound data 94 is commentary sound data of "has so far made good pitching but has not been given any help from the batters yet," for example. In this embodiment, sound data are stored in consecutive recording regions of the CD-ROM 19 in a divisional manner on a sector-by-sector basis. The sector is a data management unit in the CD-ROM 19. For example, one sector is 2,048 bytes.

For example, the sound data group 19c includes monaural sound data and stereo sound data. As for stereo sound data, left-speaker sound data and right-speaker sound data are arranged alternately. For example, one-sector sound data for the respective speakers are arranged alternately.

Figure 3:
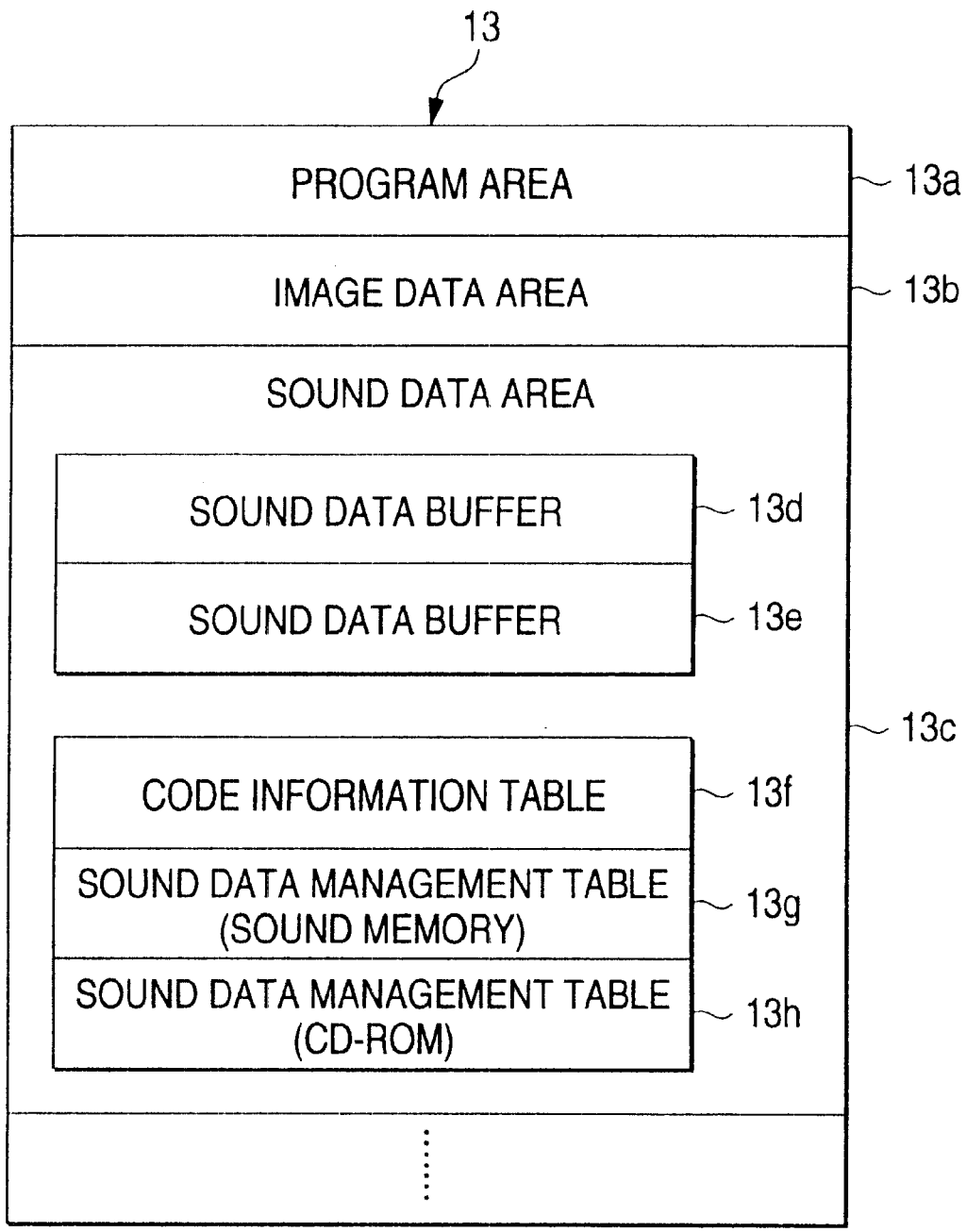
FIG. 3 schematically shows an example data structure of a RAM.

Next, the data structure of the RAM 13 will be described. FIG. 3 schematically shows an example data structure of the RAM 13. The RAM 13 is provided with a program area 13a, an image data area 13b, a sound data area 13c, etc. Part or all of a program that is read from the CD-ROM 19 is stored in the program area 13a. Model data of characters to be displayed on the display screen 101 and other data are stored in the image data area 13b.

For example, the sound data area 13c is provided with two sound data buffers 13d and 13e. A code information table 13f, a sound data management table 13g for a sound memory and a sound data management table 13h for a CD-ROM are stored in the sound data area 13c.

The sound data buffers 13d and 13e are storage areas where to store temporarily sound data that is read from the CD-ROM 19. Each of the sound data buffers 13d and 13e can store data of 16 sectors, for example.

In this embodiment, the two sound data buffers 13d and 13e constitute a double buffer structure. That is, a series of sound data are transferred to the RAM 13 in such a manner that while sound data is read from one sound data buffer, sound data is stored in the other sound data buffer. When data reading from one sound data buffer has finished, the sound data buffer as a subject of data reading and the sound data buffer as a subject of data storage are interchanged. This configuration makes it to perform transfer and reading of a series of data in a parallel manner.

Figure 4:
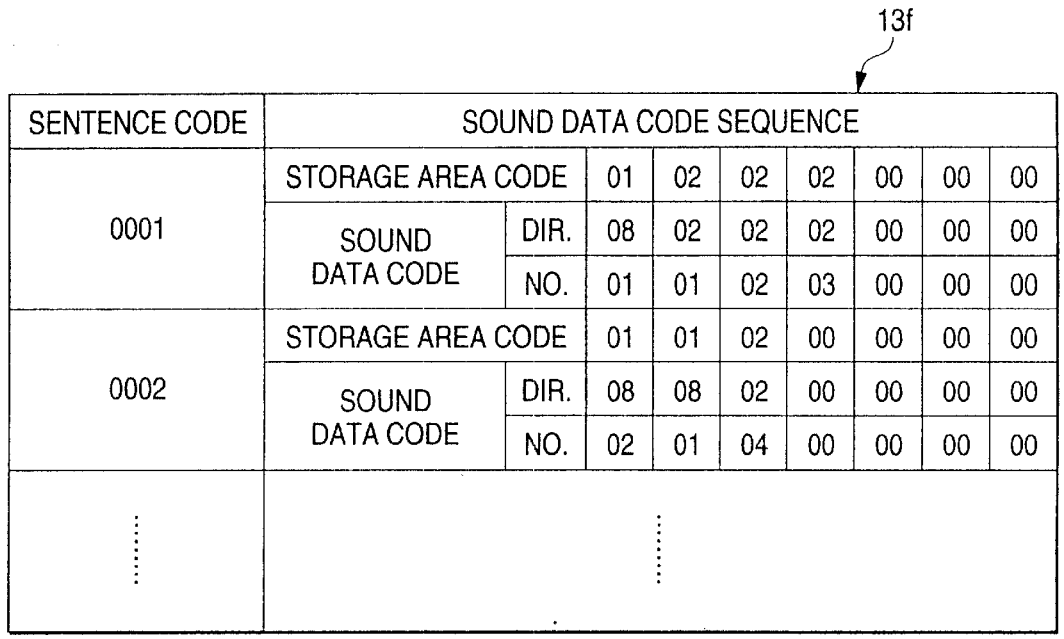
FIG. 4 shows an example of a code information table.

FIG. 4 shows an example of the code information table 13f. The code information table 13f has sentence code columns and sound data code sequence columns.

The sentence code columns accommodate codes for identifying respective sound data stored in the CD-ROM 19. In the example of FIG. 4, codes "0001," "0002," . . . are accommodated in the sentence code columns. For example, the sentence code "0001" represents "Suzuki threw the third pitch with a nothing-two count." and the sentence code "0002" represents "Pitcher Suzuki has so far made good pitching but has not been given any help from the batters yet." The sentence code of a sentence to be output is specified in a sound output request during progress of a game.

In the sound data code sequence columns, one or more sets of a storage area code and a sound data code are accommodated from the left in order of reproduction so as to be correlated with each sentence code. A storage area code indicates the storage area of sound data that is indicated by the corresponding sound data code. In this embodiment, the storage area code "01" indicates the sound memory 18a and the storage area code "02" indicates the CD-ROM 19. The storage area code "00" means that no information relating to sound data is registered in the corresponding column. In the example of FIG. 4, storage area codes "01," "02," "02," and "02" are accommodated for the sentence code "0001" and storage area codes "01," "01," and "02" are accommodated for the sentence code "0002."

A sound data code is divided into Dir. (directory) and No. (number). Sound data for output of a sound in one storage location is identified by a set of Dir. and No. In the example of FIG. 4, a set of Dir. "08" and No. "01" (storage area "01"), a set of Dir. "02" and No. "01" (storage area "02"), a set of Dir. "02" and No. "02" (storage area "02"), and a set of Dir. "02" and No. "03" (storage area "02") are accommodated so as to be correlated with the sentence code "0001." A set of Dir. "08" and No. "02" (storage area "01"), a set of Dir. "08" and No. "01" (storage area "01"), and a set of Dir. "02" and No. "04" (storage area "02") are accommodated so as to be correlated with the sentence code "0002."

Figure 5:
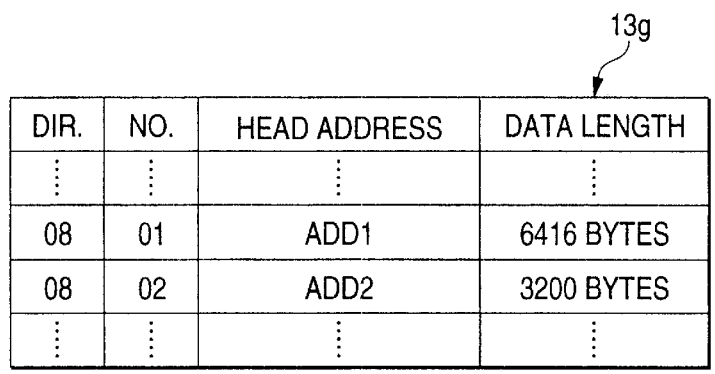
FIG. 5 shows an example data structure of a sound data management table for a sound memory.

FIG. 5 shows an example data structure of the sound data management table 13g for a sound memory. The sound data management table 13g for a sound memory has Dir. columns, No. columns, head address columns, and data length columns. A Dir. column accommodates a directory value for identifying sound data. A No. column accommodates a number for identifying sound data in such a manner that it is correlated with the corresponding directory.

A head sector number column accommodates a head sector number of sound data corresponding to the set of the associated directory and number. A data length column accommodates a data length of sound data corresponding to the set of the associated directory and number. The data length is expressed in bytes, for example. In the example of FIG. 5, the sound data having Dir. "08" and No. "01" has a head address "ADD1" and a data length of 6,416 bytes and the sound data having Dir. "08" and No. "02" has a head address "ADD2" and a data length of 3,200 bytes.

Figure 6:
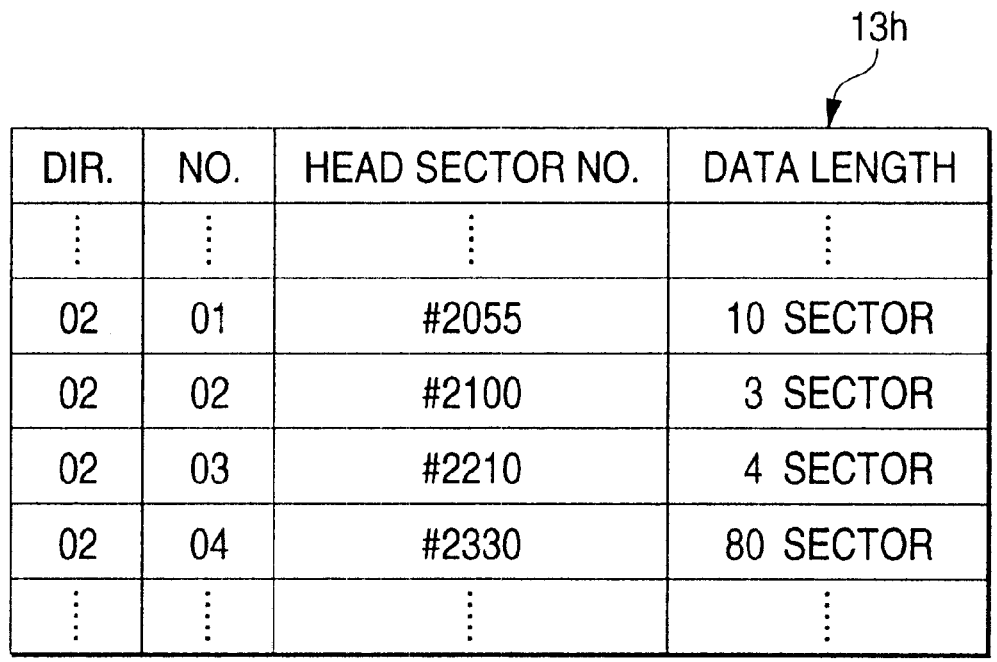
FIG. 6 shows an example data structure of a sound data management table for a CD-ROM.

FIG. 6 shows an example data structure of the sound management table 13h for a CD-ROM. The sound management table 13h has Dir. columns, No. columns, head sector number columns, and data length columns. A Dir. column accommodates a directory value for identifying sound data. A No. column accommodates a number for identifying sound data in such a manner that it is correlated with the corresponding directory.

A head address column accommodates a head address in the sound memory of sound data corresponding to the set of the associated directory and number. A data length column accommodates a data length of sound data corresponding to the set of the associated directory and number. The data length is expressed in sectors, for example.

In the example of FIG. 6, the sound data having Dir. "02" and No. "01" has a head sector number "#2055" and a data length of 10 sectors. That is, Dir. "02" and No. "01" indicate the storage area of the sound data 91 "threw" on the CD-ROM 19. The sound data having Dir. "02" and No. "02" has a head sector number "#2100" and a data length of 3 sectors. That is, Dir. "02" and No. "02" indicate the storage area of the sound data 92 "the third pitch" on the CD-ROM 19. The sound data having Dir. "02" and No. "03" has a head sector number "#2210" and a data length of 4 sectors. That is, Dir. "02" and No. "03" indicate the storage area of the sound data 93 "with a nothing-two count" on the CD-ROM 19. The sound data having Dir. "02" and No. "04" has a head sector number "#2330" and a data length of 80 sectors. That is, Dir. "02" and No. "04" indicate the storage area of the sound data 94 "has so far made good pitching but has not been given any help from the batters yet" on the CD-ROM 19.

Figure 7:
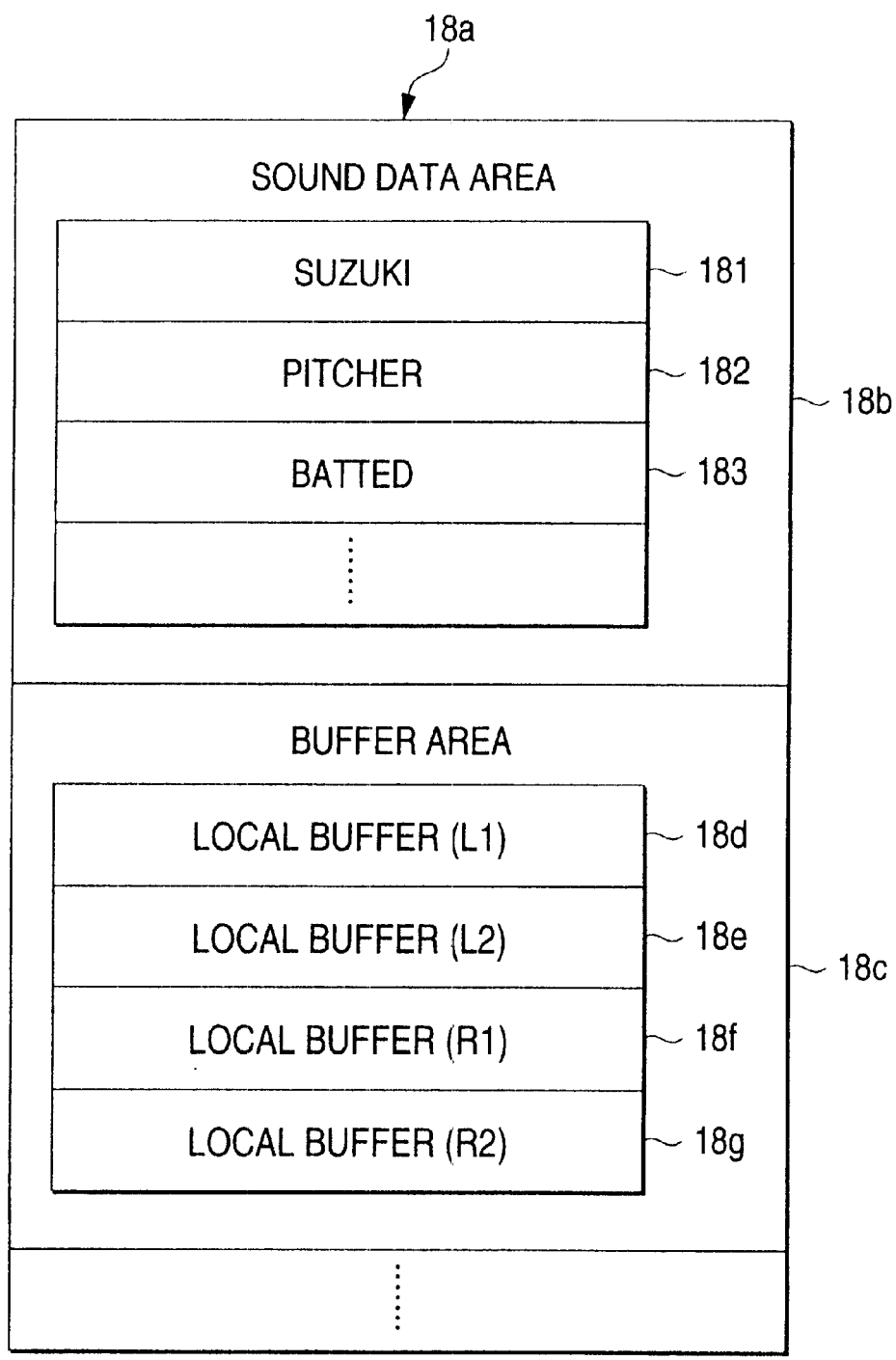
FIG. 7 schematically shows an example data structure of a sound memory.

Next, the data structure of the sound memory 18a will be described. FIG. 7 schematically shows an example data structure of the sound memory 18a. The sound memory 18a is provided with a sound data area 18b and a buffer area 18c. Sound data of baseball team names, player names, etc. are stored in the sound data area 18b. For example, sound data to be stored in the sound data area 18b are nouns (names of persons, team names, etc.), verbs ("batted," "caught," etc.), etc.

In the example of FIG. 7, sound data 181 "Suzuki," sound data 182 "pitcher," sound data 183 "batted," etc. are stored. The sound data 181 corresponds to the set of Dir. "08" and No. "01" and the sound data 182 corresponds to the set of Dir. "08" and No. "02" (see FIG. 5). These sound data are read from the CD-ROM 19 when a game is started.

The buffer area 18c is provided with four sound data buffers (hereinafter referred to as "local buffers") 18d–18g in which to store sound data that are transferred from the RAM 13. The local sound buffers 18d–18g are associated with each other so as to form two pairs. The local buffers 18d and 18e form one pair and the local buffers 18f and 18g form the other pair. Each pair is used as a double buffer.

The pair of local buffers 18d and 18e is used as a sound data recording area in reproducing monaural sound data. The pair of local buffers 18f and 18e is used as a recording area for left-side sound data in reproducing stereo sound data.

The pair of local buffers 18f and 18g is not used in reproducing monaural sound data. In reproducing stereo sound data, the pair of local buffers 18f and 18g is used as a recording area for right-side sound data.

Figure 8:
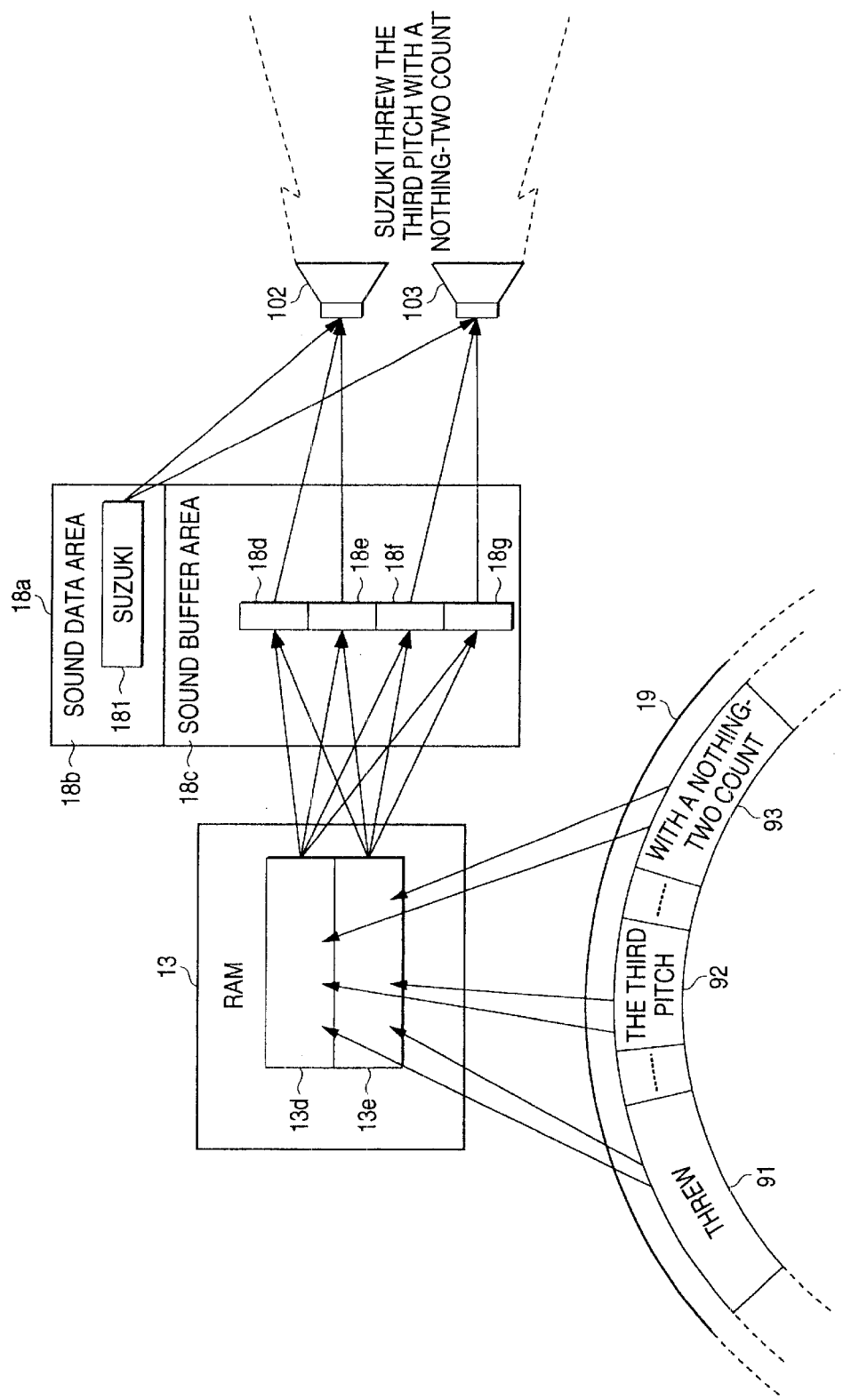
FIG. 8 schematically shows a sound data transfer process according to the embodiment.

Next, a sound data transfer process according to the embodiment will be described. FIG. 8 schematically shows the sound data transfer process according to the embodiment. When a sound output request for the sound data 91, for example, is issued as a game proceeds, transfer of the sound data 91 is started.

For example, if the sentence code "0001" is specified in a sound output request, the sound data code sequence corresponding to the sentence code "0001" in the code information table (see FIG. 4) is referred to. The sound data corresponding to the respective sound data codes of the sound data code sequence corresponding to the sentence code "0001" are acquired in order from the sound data corresponding to the head sound data code (shown at the left end in FIG. 4). In this example, first the sound data 181

"Suzuki" in the sound data area 18b is acquired. Then, the sound data 91–93 stored in the CD-ROM 19 are acquired sequentially.

The sound data 181 in the sound data area 18b is converted by the sound processing section 18 into an analog sound signal, which is output as sounds from the speakers 102 and 103. The sound data 91–93 stored in the CD-ROM 19 are transferred to the sound data buffers 13d and 13e of the RAM 13 in a divisional manner. The data stored in the sound data buffers 13d and 13e is transferred, in a divisional manner, to the local buffers 18d–18g that are provided in the buffer area 18c of the sound memory 18a. Sounds are output from the speakers 102 and 103 based on the sound data that has been transferred to the local buffers 18d–18g.

In this manner, in the example of FIG. 8, after the sound "Suzuki" is output based on the sound data 181 in the sound memory 18a, a sound consisting of "threw," "the third pitch," and "with a nothing-two count" (that are recorded on the CD-ROM 19) are output.

In the above-described manner, a sound of a live commentary statement or a comment can be output in the form of a sentence including a subject (e.g., "Suzuki") and a predicate (e.g., "threw"). Sound output of a sentence that is suitable for the states of each situation enables a realistic live commentary that is suitable for progress of a baseball game. Further, since one sentence is formed by a plurality of sound data, it is possible to output a sound that is suitable for any of various combinations of states of each situation by changing the combination of sound data. For example, in the example of FIG. 8, if the pitcher is going to throw the second pitch, the sound data "the third pitch" may be replaced by another sound data "the second pitch."

In this embodiment, in reproducing sound data stored in the CD-ROM 19, the sound data sent to the sound processing section 18 by a two-step divisional transfer. This makes it possible to reduce the number of times of access to the CD-ROM 19 even if the sound data has such a long length as to form a sentence.

For example, if the sentence code "0002" is specified in a sound output request, a comment "Pitcher Suzuki has so far made good pitching but has not been given any help from the batters yet." is output. Whereas the sound data "pitcher" and "Suzuki" are stored in the sound memory 18a, the sound data 94 "has so far made good pitching but has not been given any help from the batters yet" is stored in the CD-ROM 19. The sound data 94 corresponds to the set of Dir. "02" and No. "04" and has a data length of 80 sectors (see FIG. 6). Where the storage capacity of each of the sound data buffers 13d and 13e in the RAM 13 is 16 sectors, all of the sound data 94 cannot be transferred to the RAM 16 at one time. Divisional transfer is performed in this case.

Figure 9:
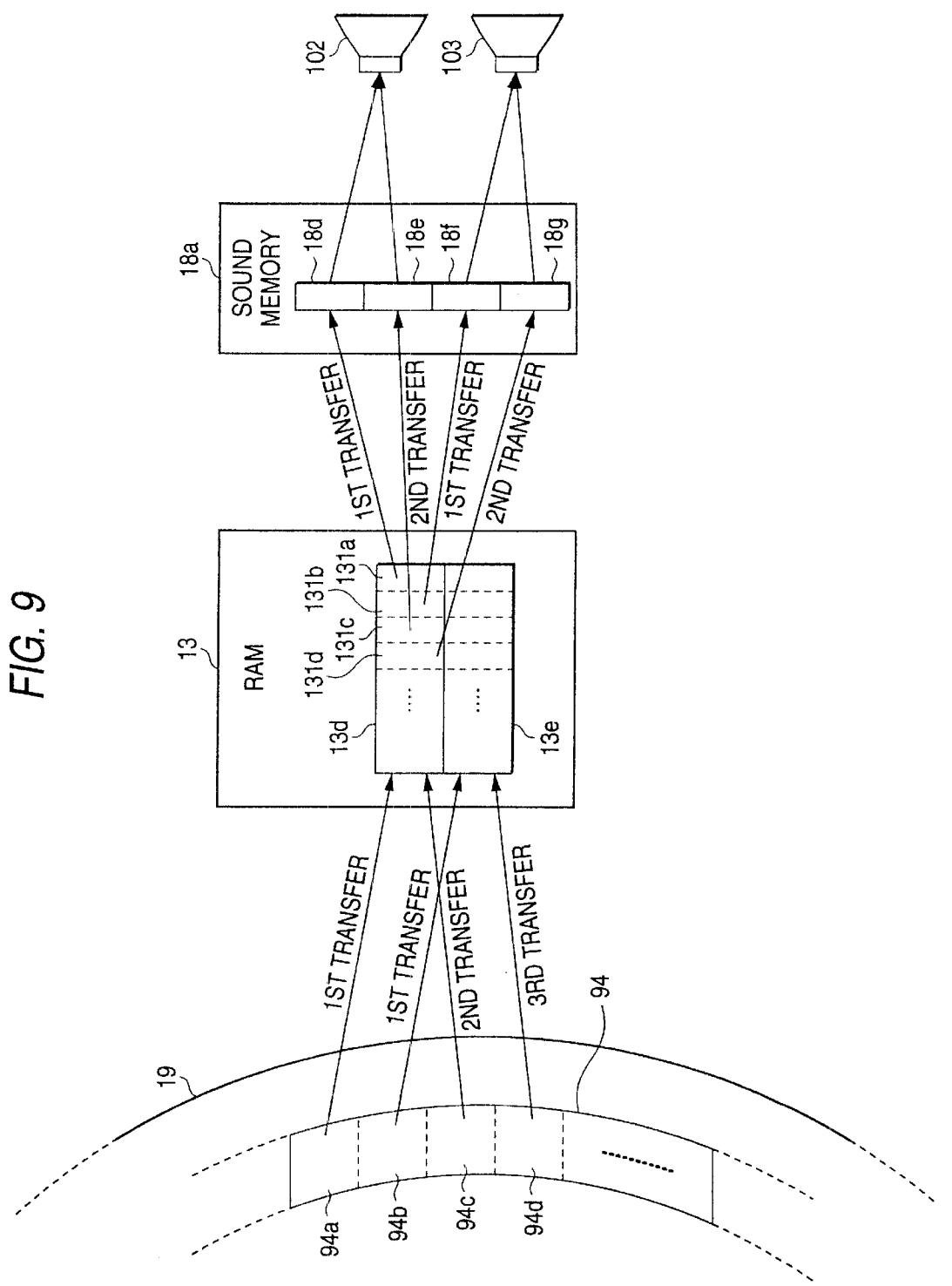
FIG. 9 schematically shows divisional transfer of sound data stored in a CD-ROM.

FIG. 9 schematically shows the divisional transfer of sound data stored in the CD-ROM 19. As shown in FIG. 9, the sound data 94 stored in the CD-ROM 19 is divided into data 94a, 94b, 94c, 94d, . . . each having a data length suitable for the storage capacity of each of the sound data buffers 13d and 13e in the RAM 13, which are transferred to the RAM 13 sequentially. For example, if each of the sound data buffers 13d and 13e has a storage capacity of 16 sectors, the sound data 94 is divided in units of 16 sectors.

In the first data transfer from the CD-ROM 19 to the RAM 13, the first two data 94a and 94b (from the head) of the sound data 94 are transferred to the RAM 13. The transferred data 94a and 94b are stored in the respective sound data buffers 13d and 13e. Subsequently, data transfer from the CD-ROM 19 to the RAM 13 is performed every time transfer of data stored in the sound data buffer 13d or 13e from the RAM 13 to the sound memory 18a is completed.

In the second data transfer from the CD-ROM 19 to the RAM 13, the third data 94c (from the head) of the sound data 94 is transferred to the RAM 13. The transferred data 94c is stored in the sound data buffer 13d, for example. In the third data transfer from the CD-ROM 19 to the RAM 13, the fourth data 94d (from the head) of the sound data 94 is transferred to the RAM 13. The transferred data 94d is stored in the sound data buffer 13e, for example. Subsequently, divisional data are transferred from the CD-ROM 19 to the RAM 13 and stored in the two sound data buffers 13d and 13e alternately. The data transfer from the CD-ROM 19 to the RAM 13 is repeated until all of the sound data 94 is transferred.

If data are stored in the sound data buffers 13d and 13e of the RAM 13, data transfer from the RAM 13 to the sound memory 18a is started. The data stored in each of the sound data buffers 13d and 13e is divided into data each having a data length suitable for the storage capacity of each of the local buffers 18d–18g. For example, in the example of FIG. 9, the data stored in the sound data buffer 13d is divided into data 131a, 131b, 131c, 131d . . . .

The divisional data is transferred to the sound memory 18a sequentially. In this embodiment, it is assumed that the storage capacity of each of the local buffers 18d–18g is one sector. In this case, data stored in each of the sound data buffers 13d and 13e is divided in units of one sector.

For example, the data transfer from the RAM 13 to the sound memory 18a is performed on a one-sector basis or a two-sector basis. If the sound data 94 is monaural sound data, the data transfer is performed on a one-sector basis. If the sound data 94 is stereo sound data, the data transfer is performed on a two-sector basis. FIG. 9 shows the case of data transfer on a two-sector basis.

In the first data transfer from the RAM 13 to the sound memory 18a, the data 13a and 131b in the sound data buffer 13d, for example, are transferred to the sound memory 18a. In this example, the data 131a and 131b are for the left speaker 102 and the right speaker 103, respectively. The transferred data 131a and 131b are stored in the local buffers 18d and 18f in the sound memory 18a, respectively.

After completion of the transfer of the data 131a and 131b to the sound memory 18a, a sound corresponding to the data 131a is output from the left speaker 102 and a sound corresponding to the data 131b is output from the right speaker 103.

The next data 131c and 131d are transferred to the sound memory 18a during reproduction of the sounds corresponding to the data 131a and 131b. The transferred data 131c and 131d are stored in the local buffers 18e and 18g in the sound memory 18a, respectively.

After completion of the output of the sounds corresponding to the data 131a and 131b, the local buffers as subjects of data reading are switched and sounds corresponding to the data 131c and 131d are output. After completion of the output of the sounds corresponding to the data 131c and 131d, the data following the 131c and 131d are transferred from the RAM 13 to the sound memory 18a. The transferred data are stored in the local buffers 18d and 18f.

Subsequently, data transfer from the RAM 13 to the sound memory 18a is performed every time sound output based on data stored in the local buffers 18d–18g is completed. Among data that are transferred sequentially, data for the left speaker 102 are stored in the local buffers 18d and 18e alternately and data for the right speaker 103 are stored in the local buffers 18f and 18g alternately.

By performing the two-step transfer in the above manner, the number of times of access to the CD-ROM 19 can be made smaller than in a case where data is directly transferred from the CD-ROM 19 to the sound processing section 18. Where data is directly transferred from the CD-ROM 18*a* to the sound memory 18*a* in a divisional manner, the data needs to be divided into parts each having a short data length suitable for the storage capacity of each of the local buffers 18*d*–18*g* in the sound memory 18*a*. In contrast, where data is transferred from the CD-ROM 19 to the RAM 13, satisfactory results are obtained by dividing the data into parts each having a data length suitable for the storage capacity of each of the sound data buffers 13*d* and 13*e* in the RAM 13.

When all the data stored in the sound data buffer 13*d* in the RAM 13 has been transferred to the sound memory 18*a*, divisional transfer of the data stored in the other sound data buffer 13*e* to the sound memory 18*a* is started. While the data is transferred from the sound data buffer 13*e*, the next data is transferred from the CD-ROM 19 to the sound data buffer 13*d*.

Figure 10:
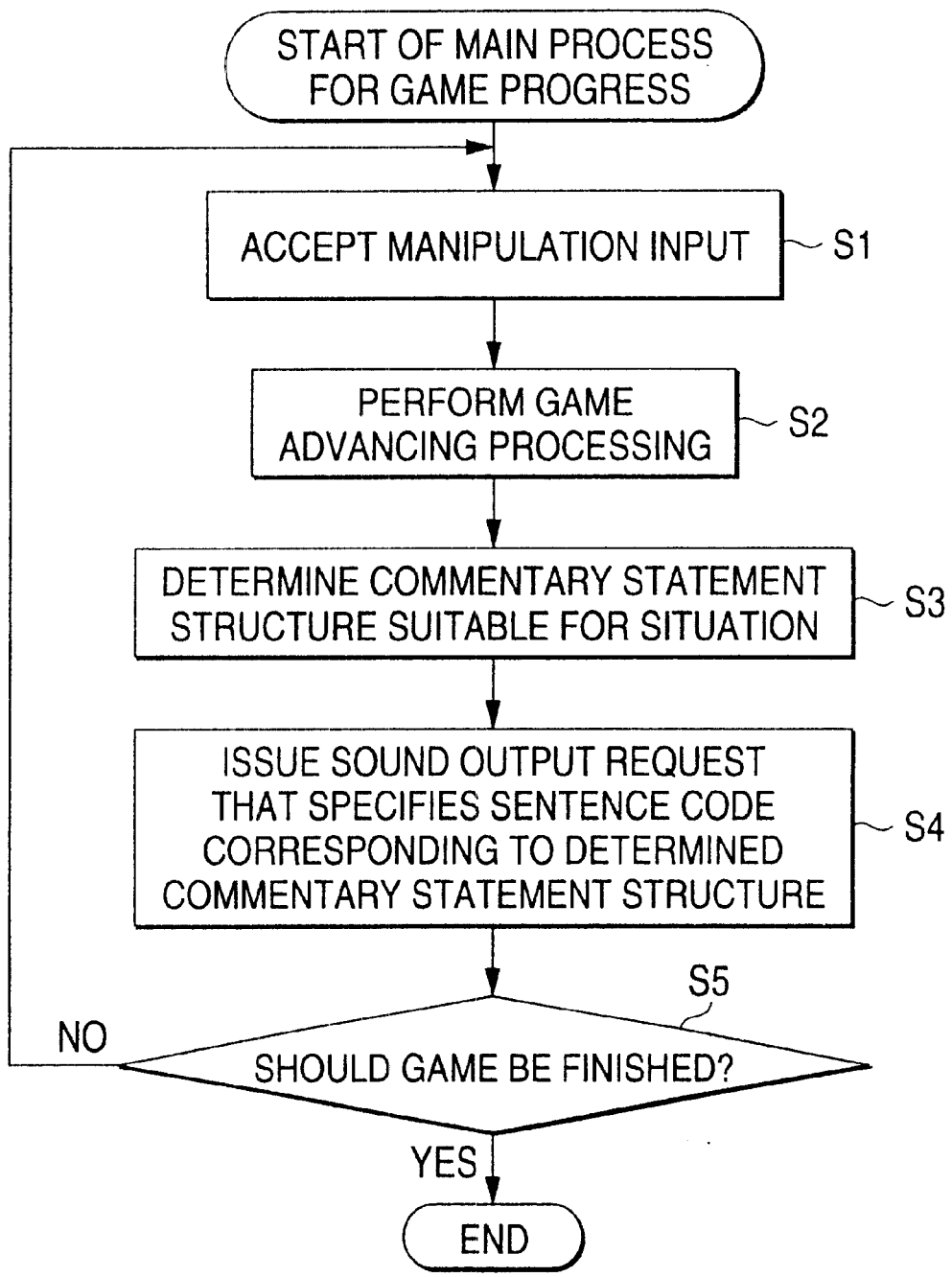
FIG. 10 is a flowchart showing a main process for advancing a game.

Now, a main process of a baseball game will be described. FIG. 10 is a flowchart showing a main process for advancing a game. First, at step S1, a manipulation input of a user is accepted through the key-pad 50. At step S2, the baseball game is advanced in response to the manipulation input. For example, throwing motion of the pitcher is started in response to a manipulation input that commands throwing of the pitcher.

At step S3, a proper commentary statement structure is determined in accordance with the state of progress of the game. Examples of the state of progress of the game to be taken into consideration are an out count, a strike count, points of both teams, and bases on which runners exist. For example, when the pitcher has started throwing motion for the first pitch, a commentary statement structure is determined by causing "has wound up for the first pitch" to follow the name of the pitcher. The commentary statement structure means a permutation of sound data to be used for outputting a live commentary sound. The permutation is defined by a combination and order of its elements.

After the commentary statement structure has been determined, at step S4 a sound output request is issued that specifies a sentence code corresponding to the determined commentary statement structure. Sentence codes are correlated in advance with respective situations that may occur during a game. At step S5, it is judged whether the game should be finished. A judgment "the game should be finished" is made when, for example, the user inputs a manipulation for finishing the game.

If the game should be finished (yes at step S5), the process of the game is finished. If the game should not be finished (no at step S5), the process returns to step S1 and the game is continued.

Figure 11:
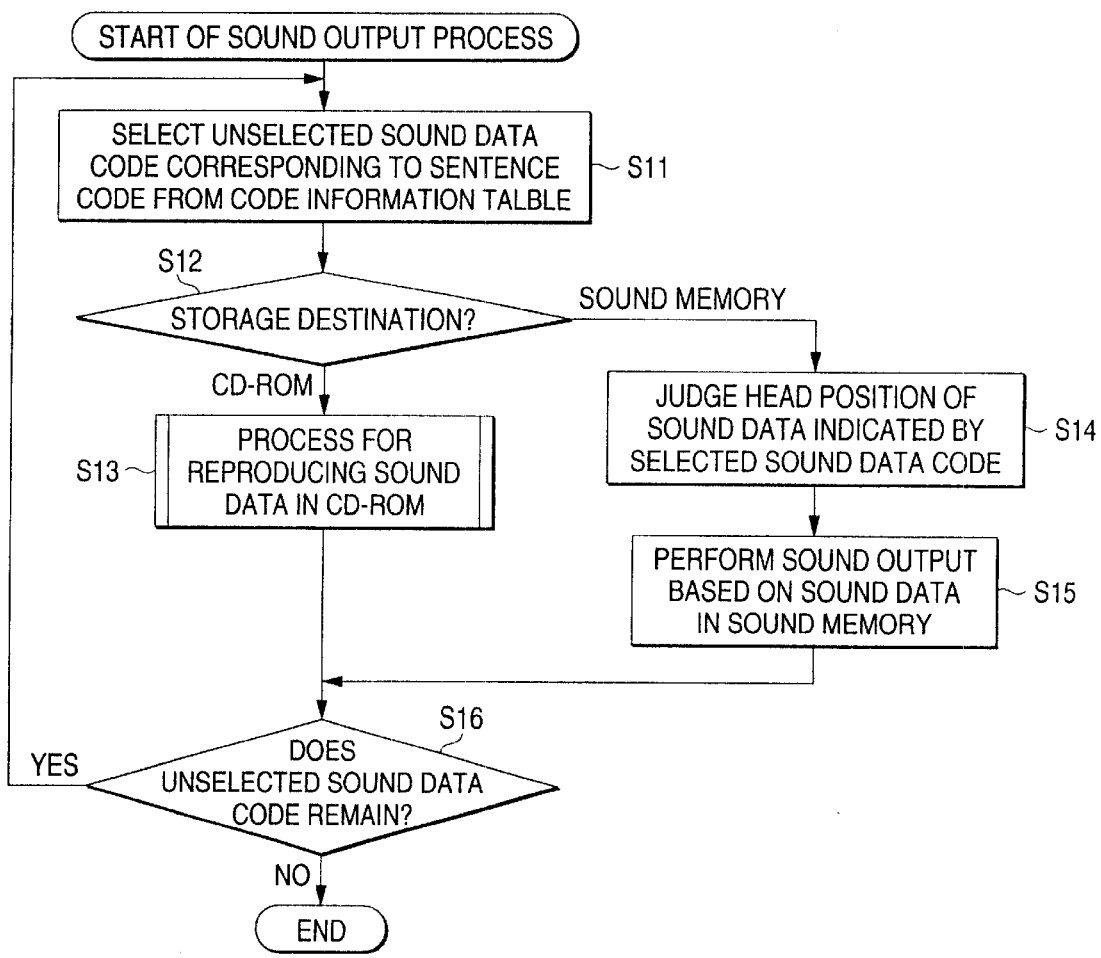
FIG. 11 is a flowchart showing a sound output process.

Next, a sound output process according to the embodiment will be described. FIG. 11 is a flowchart showing the sound output process. This process is executed when a sound output request is issued at step S4 (see FIG. 10) of the main process for advancing the game.

When a sound output request has been issued, first, at step S11, an unselected sound data code corresponding to the sentence code is selected from the code information table. The sound data codes are arranged from the left in order of reproduction of the sentence, and hence are selected in order from the left at step S11.

At step S12, a storage destination of sound data corresponding to the selected sound data code is judged based on the sound data code, more specifically, based on the storage area code that is correlated with the sound data code. The storage destination is the sound memory 18*a* if the storage area code is "01," and is the CD-ROM 19 if the storage area code is "02."

If the storage destination is the CD-ROM 19 (the judgment result at step S12 is the CD-ROM), processing of reproducing sound data in the CD-ROM 19 is performed at step S13. The details of this step will be described later. After completion of the processing of reproducing the sound data in the CD-ROM 19, the process goes to step S16.

If the storage destination is the sound memory 18*a* (the judgment result at step S12 is the sound memory), at step S14 the head position of sound data indicated by the sound data code that was selected at step S11 is judged. The head position of the sound data can be judged by referring to the head address in the sound data management table 13*g* (see FIG. 5). At step S15, sound output is performed based on the sound data at the position that was judged at step S14.

At step S16, it is judged whether there remains a sound data code that has not been selected at step S11. For example, this is done in the following manner. The order (the head is the left end in FIG. 4) of sound data codes selected at step S11 is stored. If effective data exists next to (i.e., on the right of) the sound data code just selected at step S11, it is judged that an unselected sound data code remains. The term "effective data" means data having a storage area code "01" or "02."

If there remains an unselected sound data code (yes at step S16), the process returns to step S11. If there remains no unselected sound data code (no at step S16), the sound output process is finished.

Figure 12:
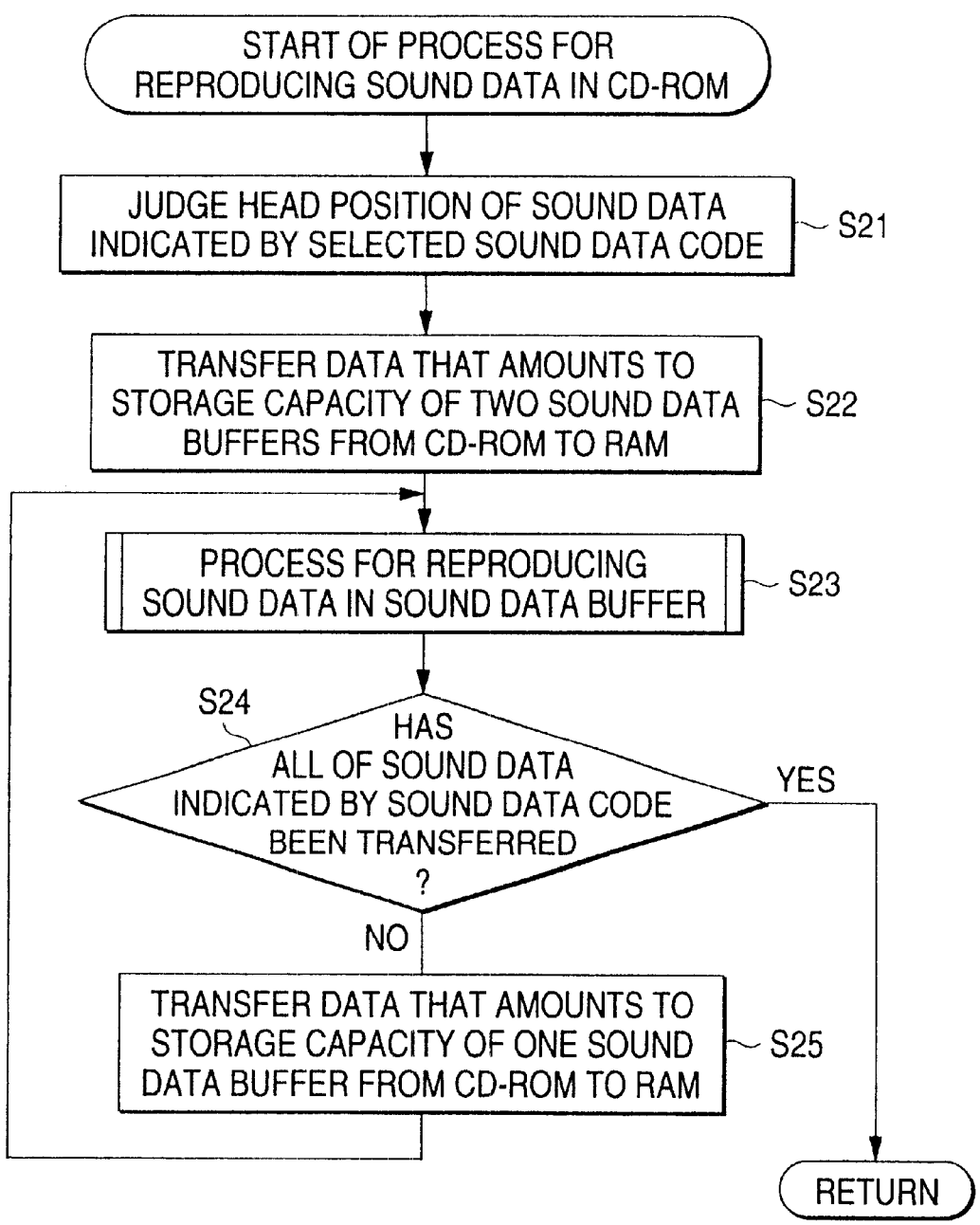
FIG. 12 is a flowchart showing a process for reproducing sound data in a CD-ROM.

Next, the process for reproducing sound data in the CD-ROM 19 will be described. FIG. 12 is a flowchart showing a process for reproducing sound data in the CD-ROM 19. First, at step S21, the head position of sound data indicated by the sound data code that was selected at step S11 (see FIG. 11) is judged. This can be done by referring to the head sector number in the sound data management table 13*h*. The data in a range indicated by the data length of the sound data and starting from the position that was judged at step S21 is made a subject of transfer.

At step S22, of the transfer subject sound data on the CD-ROM 19, data that amounts to the storage capacity of the two sound data buffers 13*d* and 13*f* (i.e., two times the storage capacity of each sound data buffer) is transferred from the CD-ROM 19 to the RAM 13. The transferred data is stored in the two sound data buffers 13*d* and 13*e* in the RAM 13.

The sound data to be transferred is specified by the sound data code. The head sector number corresponding to the code specified by the reproduction request can be acquired by referring to the sound data management table 13*h*. One sector in the CD-ROM 19 can be identified by the acquired head sector number. The identified sound data is transferred to the RAM 13. The first part of the sound data that has been transferred to the RAM 13 is stored in one sound data buffer (e.g., the sound data buffer 13*d*) and the remaining part of the sound data that has not been stored in the one sound data buffer is stored in the other sound data buffer (e.g., the sound data buffer 13*e*).

In the first data transfer of a series of data transfers from the CD-ROM 19 to the RAM 13, data that amounts to the storage capacity of two sound data buffers (e.g., 32 sectors) is transferred. If the data length of sound data is shorter than a data length corresponding to two sound data buffers, all of the sound data is transferred. The data length of sound data can be judged by referring to the data length column in the sound data management table 13*h*.

After completion of one transfer of sound data to the RAM 13, at step S23 processing of reproducing the sound data in one sound data buffer is performed. The details of this step will be described later.

After completion of the processing of reproducing the sound data in the one sound data buffer, it is judged at step S24 whether all of the sound data to be reproduced (i.e., the sound data that was specified by the sound output request) has been transferred. If all of the sound data to be reproduced has been transferred (yes at step S24), the process goes to step S16 shown in FIG. 11.

If there remains data that has not been transferred yet in the sound data to be reproduced (no at step S24), at step S25 sound data that amounts the storage capacity of one of the sound data buffers 13*d* and 13*e* in the RAM 13 is read from the CD-ROM 19 and transferred to the RAM 13. The transferred data is stored in the sound data buffer the data transfer from which to the sound memory 18*a* at step S23 has just completed. After the execution of step S25 has completed, the process goes to step S23. Because of the double buffer structure, the data transfer at step S25 and the data transfer at step S23 can be performed in parallel. Therefore, when the data transfer has started at step S25, execution of step S23 can be started without waiting for the end of the data transfer.

Figure 13:
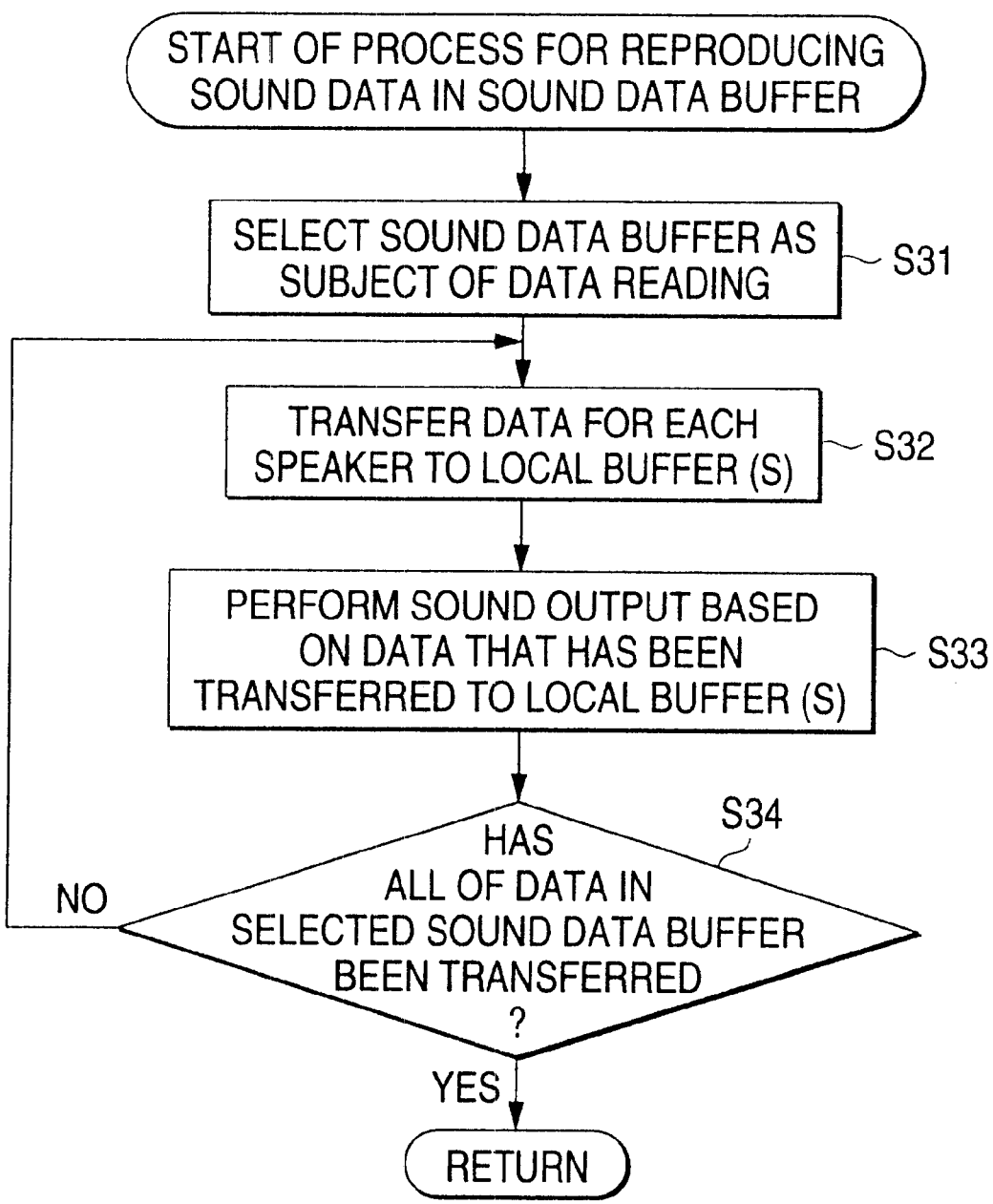
FIG. 13 is a flowchart of a process for reproducing sound data in a sound data buffer.

Next, the process for reproducing sound data in a sound data buffer will be described in detail. FIG. 13 is a flowchart showing the process for reproducing sound data in a sound data buffer. This process is started after execution of step S22 or S25 has completed.

First, at step S31, one of the sound data buffers 13*d* and 13*e* in the RAM 13 is selected as a subject of data reading. For example, the sound data buffers 13*d* and 13*e* in the RAM 13 are selected alternately as a subject of data reading in order of storage of sound data.

At step S32, the sound data stored in the reading subject sound data buffer is divided and resulting divisional data are transferred sequentially to the sound memory 18*a* in order of reproduction. The transferred data are stored in the local buffers. The sound data stored in the sound data buffer 13*d* or 13*e* is divided into data having a size suitable for the storage capacity of each of the local buffers 18*d*–18*g*, for example, one sector.

If the sound data is monaural data, one divisional data is transferred each time. On the other hand, if the sound data is stereo data, divisional data for the left and right speakers, that is, two divisional data, are transferred each time.

After the data transfer has been performed at step S32, at step S33 sound output is performed based on the data stored in the local buffers 18*d*–18*g*. After completion of the sound output at step S33, it is judged at step S34 whether all the data in the sound data buffer that is the subject of the data transfer to the sound memory 18*a* has been transferred. If the transfer of the transfer subject sound data has finished (yes at step S34), the process goes to step S24 shown in FIG. 12. If the transfer of the transfer subject sound data has not finished yet (no at step S34), the process returns to step S32, where the next data transfer is performed.

Figure 14:
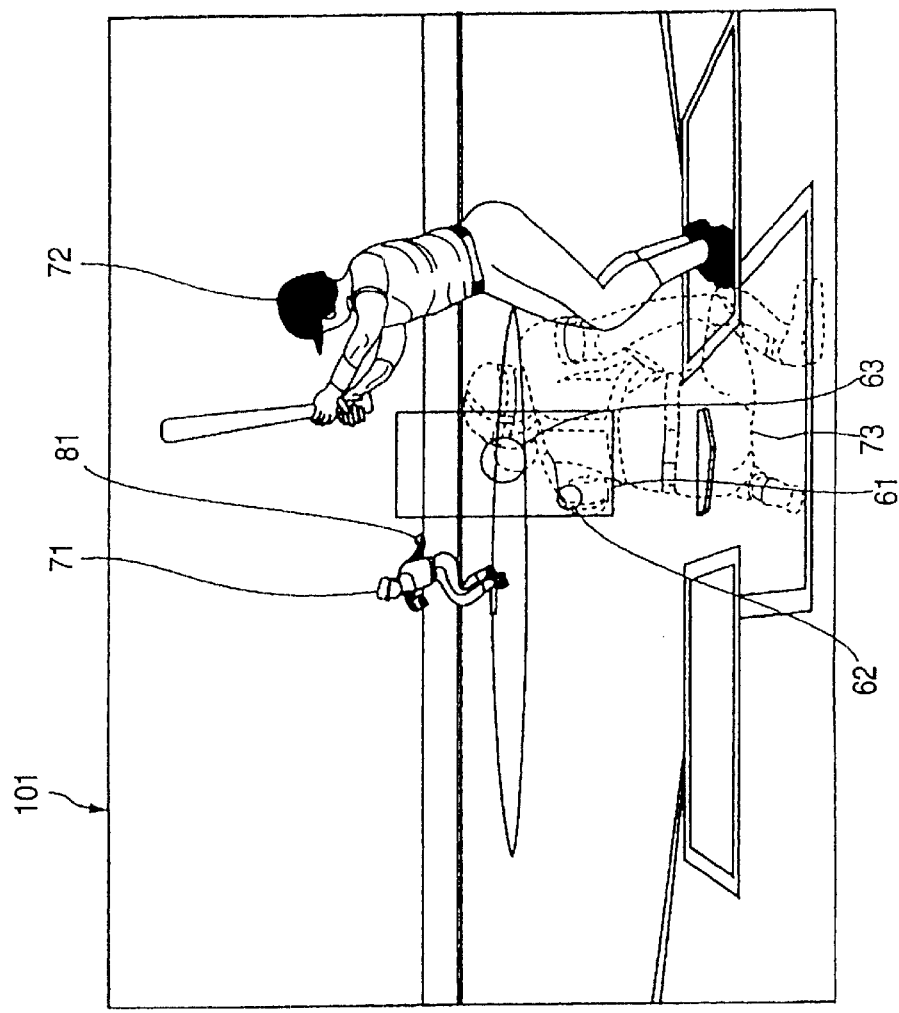
FIG. 14 shows an example of a displayed picture of a baseball game.

FIG. 14 shows an example of a displayed picture of a baseball game according to the embodiment. A pitcher 71, a batter 72, and a catcher 73 are displayed on the display screen 101. The catcher 73 is shown in a semitransparent manner. A strike zone 61, a cursor 62 to be used for specifying a throwing position, and a cursor 63 to be used for specifying a batting position are displayed in front of the catcher 73.

In this embodiment, sound data are stored in the CD-ROM 19 and can be reproduced by reading those from the CD-ROM 19 when necessary. This makes it possible to perform a live commentary in a very realistic manner. For example, in the example of FIG. 14, the pitcher is wound up and is about to throw a ball 81. In this state, a sound output request designating the code "001," for example is issued. In response to the sound output request, the sound data 94 is transferred to the RAM 13 in a divisional manner. Then, the sound data 94 is transferred to the sound memory 18*a* in a divisional manner. As a result, a sound "Suzuki threw the third pitch with a nothing-two count." is reproduced. If a sound output request designating the code "002" is issued, a sound "Pitcher Suzuki has so far made good pitching but has not been given any help from the batters yet." is reproduced.

As described above, according to the embodiment, a sound of a commentary statement or a comment including a subject and a predicate can be reproduced during a video game. Further, by storing sound data of terms to become a subject in the sound memory 18*a*, the number of times of access to the CD-ROM 19 can be reduced. In general, a commentary statement or a comment is made in the form of "Someone did something." Therefore, by storing sound data of terms corresponding to "someone" such as player names and team names in the sound memory 18*a*, sound data having high access frequencies are stored in the sound memory 18*a*. As a result, the number of times of access to the CD-ROM 19 at the time of sound outputs can be reduced.

In this embodiment, sound data stored in the CD-ROM 19 is divided and divisional data are sequentially stored in the RAM 13. Sound data stored in the RAM 13 is also divided and divisional data are sequentially transferred to the sound memory 18*a* of the sound processing section 18.

This two-step divisional transfer makes it possible to reduce the number of times of access to the CD-ROM 19, which decreases the probability that reading of sound data and reading of some other data (e.g., background image data) occur at the same time. As a result, even if a large amount of sound data is stored in the CD-ROM 19, it does not obstruct the processing of advancing a game. That is, it becomes possible to advance the game smoothly.

The timing of the divisional transfer according to the embodiment is as follows. Data is transferred from the CD-ROM 19 to the RAM 13 at a time point when transfer, to the sound memory 18*a*, of data that amounts to the storage capacity of one of the sound data buffers 13*d* and 13*e* in the RAM 13 has finished. Data is transferred from the RAM 13 to the sound memory 18*a* at a time point when sound reproduction based on data in one local buffer in the sound memory 18*a* has finished.

The number of transfers of the divisional transfer according to the embodiment is as follows: In the case of a transfer from the CD-ROM 19 to the RAM 13, in the first transfer, data that amounts to the total storage capacity of the two sound data buffers 13*d* and 13*e* in the RAM 13 (e.g., 32 sectors) is transferred at one time. Thereafter, data that amounts to the storage capacity of each of the sound data buffers 13*d* and 13*e* (e.g., 16 sectors) is transferred.

Therefore, in the case of a transfer from the CD-ROM 19 to the RAM 13, the number of transfers is equal to a value obtained by subtracting 1 from a value obtained by dividing the data length of subject sound data by the storage capacity of each of the sound data buffers 13d and 13e in the RAM 13 (decimals of the quotient are raised to the next whole number). For example, where the storage capacity of each of the sound data buffers 13d and 13e is 16 sectors, sound data of 72 sectors is transferred by four divisional transfers.

In the case of a monaural sound, the number of transfers from the RAM 13 to the sound memory 18a is equal to a value obtained by dividing the storage capacity of each of the sound data buffers 13d and 13e in the RAM 13 by the storage capacity of each of the local buffers 18d–18g in the sound memory 18a. For example, where the storage capacity of each of the sound data buffers 13d and 13e is 16 sectors and the storage capacity of each of the local buffers 18d–18g is one sector, sound data is transferred by 16 divisional transfers. In the case of a stereo sound, the number of transfers is half of that of a monaural sound data.

Although the embodiment is directed to a baseball game as an example of a sport games associated with the reproduction of sound such as a live commentary, the invention is not limited to it. The invention can also be applied to games of other sport games such as soccer, basketball, American football, tennis, and ice hockey as long as processing of reproducing sound data is performed.

The invention can be applied to game-dedicated machines, arcade machines, personal computers, personal digital assistants, cellular telephones, etc.

Although, in the embodiment a program for implementing the embodiment is recorded on a CD-ROM or hard disks, the invention is not limited to such a case. A program may be recorded on any of other computer-readable recording media such as an MO disc and a DVD. Where a program is downloaded to hard disks, a commercial network, the Internet, an intranet, an extranet, or the like may be used as the network 111.

As described above, in the invention, among sound data that constitute sentences, sound data that can be a subject are stored in the sound memory. Therefore, the number of times of access to a large-capacity recording medium can be made small in the case of outputting sound of a realistic live commentary or comments. As a result, the invention provides a computer-readable recording medium on which a program is recorded, a program, a live commentary processing apparatus and method which make it possible to read out sound data efficiently.

What is claimed is:

1. A computer-readable recording medium on which a program for processing a live commentary in a video game is recorded, the program causing a computer to:

judge states of a situation in a video game;
    determine a combination and order of at least one sound data necessary to commentate in accordance with the judged states from among sound data stored in a distributed manner as units of live commentary statements;
    recognize storage locations of the at least one sound data based on information stored in advance to be used for recognizing storage locations of the respective sound data;
    commentate by reading the at least one sound data from the recognized storage locations in the determined order;
    wherein the sound data are stored in a distributed manner in a first recording area and a second recording area, the sound data being stored in the second recording area when the video game starts, and wherein when the at least one sound data is read from the first recording area, the at least one sound data is transferred to the second recording area and commentating is performed based on the at least one sound data transferred to the second recording area; and
    wherein when the at least one sound data is read from the first recording area, the at least one sound data is transferred to the second recording area via a third recording area having at least one buffer.

2. The recording medium according to claim 1, wherein when the at least one sound data is transferred to the third recording area, the at least one sound data is divided into data each having a data length suitable for a storage capacity of each buffer in the third recording area and are transferred on a divisional data basis.

3. The recording medium according to claim 1, wherein the second recording area is provided with at least one buffer, and wherein when the at least one sound data is transferred from the third recording area to the second recording area, the at least one sound data stored in the third recording area is divided into data each having a data length suitable for a storage capacity of each buffer in the second storage area and are transferred on a divisional data basis.

4. The recording medium according to claim 3, wherein when the at least one sound data is transferred from the third recording area to the second recording area, data that amounts to two times the storage capacity of each buffer in the second recording area is transferred in one transfer when the at least one sound data comprises stereo sound data.

5. A program for processing a live commentary in a video game, the program causing a computer to:

judge states of a situation in a video game;
    determine a combination and order of at least one sound data necessary to commentate in accordance with the judged states from among sound data stored in a distributed manner as units of live commentary statements;
    recognize storage locations of the at least one sound data based on information stored in advance to be used for recognizing storage locations of the respective sound data;
    commentate by reading the at least one sound data from the recognized storage locations in the determined order;
    wherein the sound data are stored in a distributed manner in a first recording area and a second recording area, the sound data being stored in the second recording area when the video game starts, and wherein when the at least one sound data is read from the first recording area, the at least one sound data is transferred to the second recording area and commentating is performed based on the at least one sound data transferred to the second recording area; and
    wherein when the at least one sound data is read from the first recording area, the at least one sound data is transferred to the second recording area via a third recording area having at least one buffer.

6. The program according to claim 5, wherein when the at least one sound data is transferred to the third recording area, the at least one sound data is divided into data each having a data length suitable for a storage capacity of each buffer in the third recording area and are transferred on a divisional data basis.

7. The program according to claim 5, wherein the second recording area is provided with at least one buffer, and wherein when the at least one sound data is transferred from the third recording area to the second recording area, the at least one sound data stored in the third recording area is divided into data each having a data length suitable for a storage capacity of each buffer in the second storage area and are transferred on a divisional data basis.

8. The program according to claim 7, wherein when the at least one sound data is transferred from the third recording area to the second recording area, data that amounts to two times the storage capacity of each buffer in the second recording area is transferred in one transfer when the at least one sound data comprises stereo sound data.

9. A live commentary processing apparatus, comprising:
a recording medium on which a program for realizing live commentary processing in a video game is recorded; and
a computer that reads at least part of the program from the recording medium and executes it, the computer executing, by reading at least part of the program from the recording medium:
judging states of a situation in a video game;
determining a combination and order of at least one sound data necessary to commentate in accordance with the judged states from among sound data stored in a distributed manner as units of live commentary statements;
recognizing storage locations of the at least one sound data based on information stored in advance to be used for recognizing storage locations of the respective sound data;
commentating by reading the at least one sound data from the recognized storage locations in the determined order;
wherein the sound data are stored in a distributed manner in a first recording area and a second recording area, the sound data being stored in the second recording area when the video game starts, and wherein when the at least one sound data is read from the first recording area, the at least one sound data is transferred to the second recording area and commentating is performed based on the at least one sound data transferred to the second recording area; and
wherein when the at least one sound data is read from the first recording area, the at least one sound data is transferred to the second recording area via a third recording area having at least one buffer.

10. The live commentary processing apparatus according to claim 9, wherein when the at least one sound data is transferred to the third recording area, the at least one sound data is divided into data each having a data length suitable for a storage capacity of each buffer in the third recording area and is transferred on a divisional data basis.

11. The live commentary processing apparatus according to claim 9, wherein the second recording area is provided with at least one buffer, and wherein when the at least one sound data is transferred from the third recording area to the second recording area, the at least one sound data stored in the third recording area is divided into data each having a data length suitable for a storage capacity of each buffer in the second storage area and is transferred on a divisional data basis.

12. The live commentary processing apparatus according to claim 11, wherein when the at least one sound data is transferred from the third recording area to the second recording area, data that amounts to two times the storage capacity of each buffer in the second recording area is transferred in one transfer when the at least one sound data comprises stereo sound data.

13. A live commentary processing method for processing a live commentary in a video game, comprising:
judging states of a situation in a video game;
determining a combination and order of at least one sound data necessary to commentate in accordance with the judged states from among sound data stored in a distributed manner as units of live commentary statements;
recognizing storage locations of the at least one sound data based on information stored in advance to be used for recognizing storage locations of the respective sound data;
commentating by reading the at least one sound data from the recognized storage locations in the determined order;
wherein the sound data is stored in a distributed manner in a first recording area and a second recording area, the sound data being stored in the second recording area when the video game starts, and wherein when the at least one sound data is read from the first recording area, the at least one sound data is transferred to the second recording area and commentating is performed based on the at least one sound data transferred to the second recording area; and
wherein when the at least one sound data is read from the first recording area, the at least one sound data is transferred to the second recording area via a third recording area having at least one buffer.

14. The live commentary processing method according to claim 13, wherein when the at least one sound data is transferred to the third recording area, the at least one sound data is divided into data each having a data length suitable for a storage capacity of each buffer in the third recording area and is transferred on a divisional data basis.

15. The live commentary processing method according to claim 13, wherein the second recording area is provided with at least one buffer, and wherein when the at least one sound data is transferred from the third recording area to the second recording area, the at least one sound data stored in the third recording area is divided into data each having a data length suitable for a storage capacity of each buffer in the second storage area and is transferred on a divisional data basis.

16. The live commentary processing method according to claim 15, wherein when the at least one sound data is transferred from the third recording area to the second recording area, data that amounts to two times the storage capacity of each buffer in the second recording area is transferred in one transfer when the at least one sound data comprises stereo sound data.

* * * * *